United States Patent [19]

Hege et al.

[11] Patent Number: 5,730,668
[45] Date of Patent: Mar. 24, 1998

[54] PORTABLE BASKETBALL GOAL ASSEMBLY WITH STORAGE BASE

[75] Inventors: Greg Hege, Libertyville; Edward A. Schroeder, Marengo, both of Ill.

[73] Assignee: Porter Athletic Equipment Company, Broadview, Ill.

[21] Appl. No.: 569,421

[22] Filed: Dec. 6, 1995

[51] Int. Cl.[6] ............................................ A63B 63/08
[52] U.S. Cl. .................. 473/472; 206/315.9; 206/427; 248/910
[58] Field of Search ..................... 473/472, 479, 473/480, 481; 206/315.1, 315.9, 315.91, 139, 427; 248/910

[56] References Cited

U.S. PATENT DOCUMENTS

| | | |
|---|---|---|
| 3,025,058 | 3/1962 | Brumfield . |
| 3,401,535 | 9/1968 | Palmer ............................ 206/139 X |
| 3,716,234 | 2/1973 | Lancellotti . |
| 3,722,886 | 3/1973 | Sinner . |
| 3,841,631 | 10/1974 | Dolan . |
| 4,311,223 | 1/1982 | Stein ............................. 206/315.9 |
| 4,412,679 | 11/1983 | Mahoney et al. . |
| 4,526,367 | 7/1985 | Haston et al. . |
| 4,869,501 | 9/1989 | Anastasakis . |
| 4,946,163 | 8/1990 | Aakre et al. . |
| 4,979,754 | 12/1990 | Eisenhart . |
| 5,098,092 | 3/1992 | Aakre et al. . |
| 5,102,128 | 4/1992 | Geise . |
| 5,207,407 | 5/1993 | Fitzsimmons et al. . |
| 5,248,140 | 9/1993 | Matherne et al. . |
| 5,259,612 | 11/1993 | Matherne et al. . |
| 5,354,049 | 10/1994 | Matherne et al. . |
| 5,390,914 | 2/1995 | Schroeder . |

*Primary Examiner*—William H. Grieb
*Attorney, Agent, or Firm*—Barnes & Thornburg

[57] ABSTRACT

A base for an athletic assembly unit to which a support is connected and which includes a hollow compartment for receiving the ballast and including a top wall and a port for access to the hollow compartment. A first recess in the top wall of the hollow compartment and a cover attached to the base for covering the recess form a storage compartment. The storage compartment is sized to store basketballs and beverage containers and may be insulated thermally.

15 Claims, 4 Drawing Sheets

PORTABLE BASKETBALL GOAL ASSEMBLY WITH STORAGE BASE

BACKGROUND AND SUMMARY OF THE INVENTION

The present invention is generally to portable basketball goal assemblies and more specifically to portable basketball goal assemblies with storage.

Portable basketball goal assemblies have many structures and methods of operation. The most simple is a weighted base with wheels wherein the erect support for the backboard is tilted back over the wheels to be transported as illustrated in U.S. Pat. No. 3,025,058 to Brumfield. Other structures have been disassembled into a planar configuration as illustrated by U.S. Pat. Nos. 3,716,234 to Lancellotti and 4,869,501 to Anastasakis. Others include a vertical support structure which collapses vertically as illustrated in U.S. Pat. Nos. 4,526,367 to Haston, et al. and 5,102,128 to Geise. An example of a system using pivotal links or braces to collapse the assembly into a planar position and rotating it up on a series of wheels is illustrated by U.S. Pat. Nos. 4,946,163 and 5,098,092 to Aakre, et al. Further examples of wheeled bases which are portable without adjustment are shown by U.S. Pat. Nos. 3,722,886 to Sinner and 5,207,407 to Fitzsimmons, et al. In the addition to the above, an example of a wheeled support having an enclosure for receiving ballast was exemplified by U.S. Pat. No. 3,841,631 to Dolan.

In designing a portable basketball goal assembly there are many design criteria which must be balanced. Some of the goals are designed strictly for transporting and not for storage. Others are made to be transported and stored and therefore break down into a flat stored position. Others are transportable and storable by collapsing the support structure with the backboard and rim combination vertically. Some of the systems have permanent weight in the base and others are either stabilized by sandbags or include a hollow base to which ballast may be added or removed. If wheels are not included, the hollow base must be emptied of the ballast to be moved. Those with wheels may be moved with the ballast, and thus the ease of operation to move from a playing position of the system to a transport position of the system is important.

Another important design criteria is the footprint of the basketball goal assembly. The footprint is defined as the area including the base to the backboard. This is the area that would be needed to accommodate the assembly structure. The dimension to be minimized is the length from the rear of the base to the backboard. This is especially important when a portable basketball unit is used on driveways, carport aprons, etc.

The more recent development in the portable basketball goal assemblies is that they all have hollow bases which are filled with ballast. Typical examples are U.S. Pat. Nos. 5,207,407; 5,248,140; 5,259,612; 5,354,049; and 5,390,914. Several of these assemblies are designed for ease of packaging and others for safety of the conversion from the erect to the transport position. Although addressing storage of the unit totally, none of them address the ability of providing for storage of equipment such as basketballs.

As previously discussed, a base for a basketball assembly is capable of holding ballast in its in use position and is also capable of storing the support and bracket assembly therein in a carrying case as described in U.S. Pat. No. 3,716,234 to Lancellotti. These are two alternative uses. The use of a net support to support a net in a portable beach game and holding ballasts therein may also be used to store the net and ball as illustrated in U.S. Pat. No. 4,979,754 to Eisenhart. Again, this is a common hollow-based structure which is capable of holding ballasts in one condition and storing the game equipment in a second condition. Thus, there exists a need for a portable basketball assembly which is capable of holding ballasts and storing equipment at the same time.

It is an object of the present invention to provide a portable athletic assembly which is capable of storing ballasts and athletic equipment at the same time.

Another object of the present invention is to provide a portable athletic assembly which is capable of holding ballasts and storing equipment within a limited footprint.

A still even further object of the present invention is to provide a portable basketball assembly unit having a storage in the base which is economical to produce.

An even further object is to provide a portable athletic and cooler assembly which is capable of holding ballasts and cooling beverages.

These and other objects are achieved by providing a base for an athletic assembly unit to which a support is connected and which includes a hollow compartment for receiving the ballast and including a top wall and a port for access to the hollow compartment. A first recess in the top wall of the hollow compartment and a cover attached to the base for covering the recess form a storage compartment. The storage compartment is sized to store basketballs and beverage containers and may be insulated thermally. The cover can either be pivotally connected or removable from the base. The cover forms a continuation of the top surface extending from its attachment to the base. The first recess is sufficiently deep such that a basketball in the recess is substantially at or below the top wall of the hollow compartment. The first recess is elliptical for receiving a pair of basketballs. The bottom wall of the cover includes a pair of partial spherical recesses, each for receiving a portion of a basketball.

The storage compartment may also cool beverages. Thermal insulation is provided for the storage compartment. The floor of the storage compartment includes recesses for receiving beverage containers. Also, a drain plug is provided on the floor. The top wall of the hollow compartment includes second recesses which receive the connection of the brackets which connect the support to the base. The portable support mounted may also be used to support a basketball backboard/rim, volleyball net or other kinds of athletic equipment.

DETAILED DESCRIPTION OF THE PREFERRED EMBODIMENTS

Figure 1:
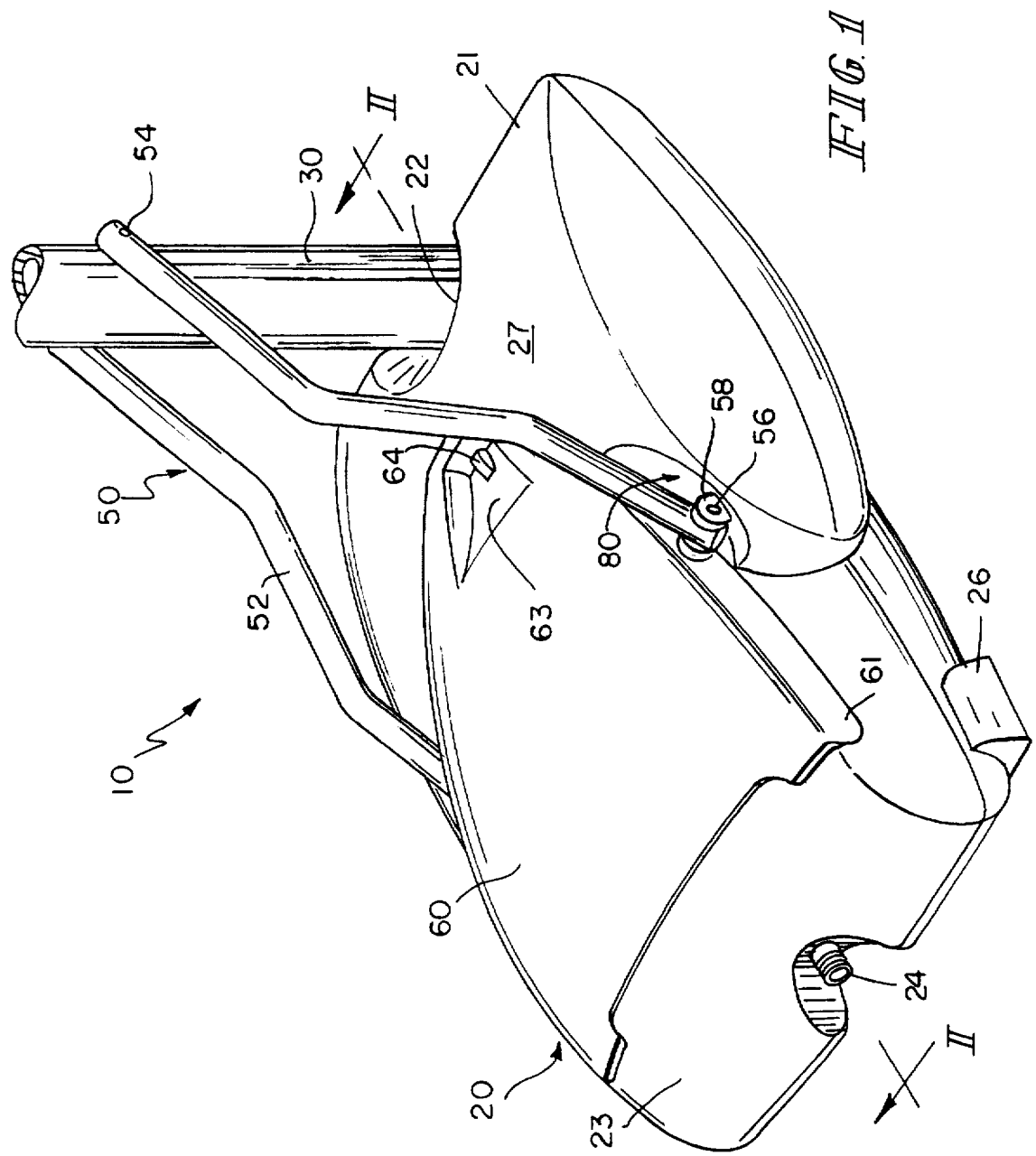
FIG. 1 is a perspective view of the a portable athletic assembly incorporating the principles of the present invention.

A portable athletic assembly 10 is illustrated in the Figures as including a base 20, having support 30 pivotally connected thereto and a bracket assembly 50 stabilizing the support 30 with respect to the base 20. A rod or axle 16 pivotally connects not only the support 30 to the end 21 of the base 20, but also a pair of wheels 15. It should be noted that the wheels 15 are above the ground when the base 20 is in the horizontal position and engages the ground once the base is pivoted on the wheels. The base 20 includes feet 26, two at end 21 and two at end 23 to support the base above the ground. The feet 26 may have a roughened or textured surface so as to prevent the base 20 from moving. The base 20 is a hollow structure having port 24 providing access to hollow compartment 25. As is well known, compartment 25 receives ballast to provide weight to the portable assembly. The ballast may be sand, water or any other heavy material. As will be discussed below, if the base is used as a cooler, a cool liquid or ice may be insert through the port 24. The port 24 would receive a cap. It may also be modified or enlarged if it is to receive substantial pieces of ice.

The base 20 includes a cover 60 which covers recess 70 in the top wall 27 of the base to form a storage compartment therein. The top wall 27 includes a second recess 80 to receive the connections of the bracket assembly 50. The bracket assembly includes brackets 52 pivotally connected to the support 30 by pin 54. The other ends of the brackets 52 are pivotally connected by pin 56 to bracket 58 in recess 80 in the top wall. The brackets 58 are mounted to the top of the recess 80.

The cover 60 is a molded assembly having integrally formed protrusions or pivots 62 extending from ears 61. The protrusion 62 are received in openings in walls 28 of the base 20. Recess 63 in the top of cover 60 provide access to a latch 64 which mates with an aperture 65 in the top wall 27, shown in FIG. 3. The latch 64 may also include a locking mechanism (not shown). The cover 60 forms an extension of the top surface from where it connects at the end 23 of the base. As discussed below, the underside of the cover 60 includes partially spherical recesses 66 to receive a ball B in the compartment as illustrated in FIG. 2.

Figure 2:
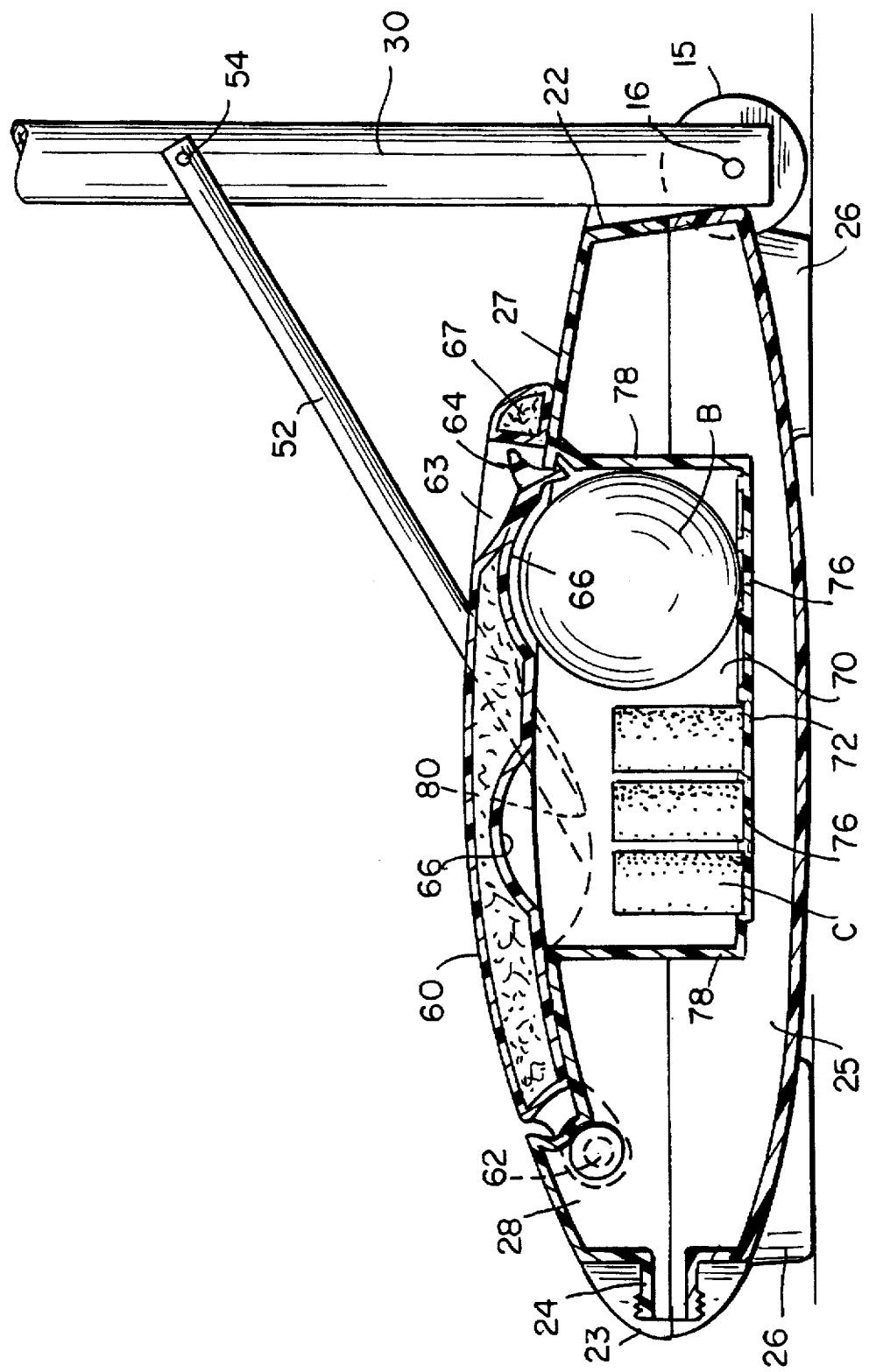
FIG. 2 is a cross-sectional view taken along lines of II—II of FIG. 1.
Figure 3:
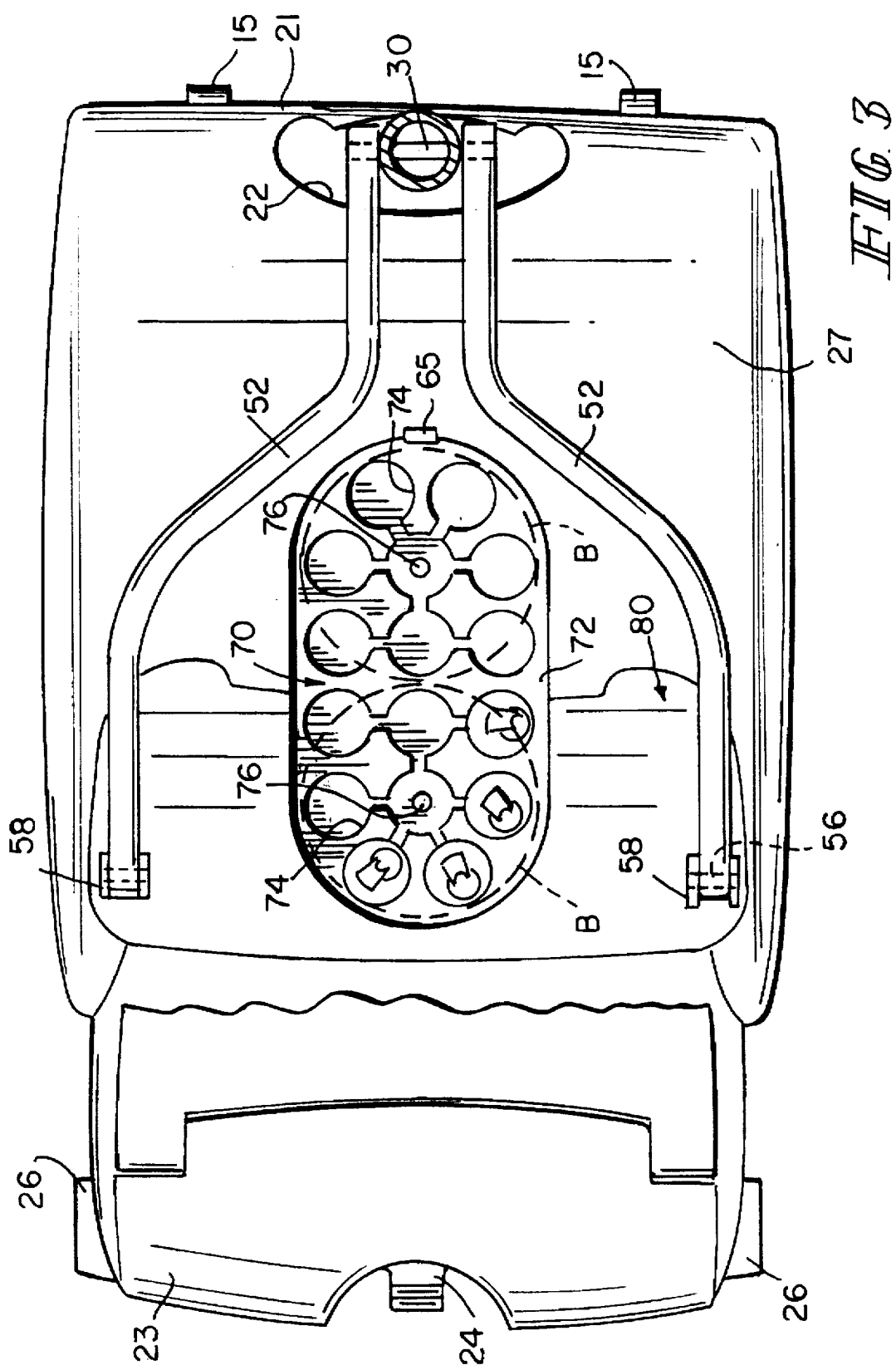
FIG. 3 is a top plan view of FIG. 1 with the storage cover removed.

The recess 70, as illustrated in FIG. 3, is substantially elliptical and capable of receiving a pair of balls, preferably basketballs, a illustrated in phantom in FIG. 3. As noted in FIG. 2, the depth of the recess 70 and combined with the spherical recesses 66 in the bottom wall of the cover 60 are sufficient to store a ball B, for example, a basketball therein. The top of the ball B is substantially at or below the top wall 27 of the hollow compartment 25 adjacent the recess 70. If the standard is used as a stanchion for a volleyball system, the ball B would be a volleyball.

The storage compartment formed by recess 70 and cover 60 may also be used as a cooler. In such instances, it would store beverages to be cooled. As shown specifically in FIG. 3, the bottom wall 72 has formed therein, by molding or other processes, a plurality of recesses 74 to receive beverage containers. For each cluster of recesses 74, a drain 76 is provided with a removable plug. This allows placing of ice or other coolants in the recess 70 and draining without tilting the base 20. The containers of beverage C are shown in FIG. 2. To insulate the recess 70, thermo insulation 78 may be placed along the side and bottom walls of the recess 70. The cover 60 may also have insulation applied to the surface thereof. Alternatively, since the cover 60 is hollow, insulation, illustrated at 67 in FIG. 2, may be provided in the interior of the hollow cover 60. Alternatively, a portable cooler, for example, a styrofoam cooler, may be inserted into the recess 70. It may occupy the total recess 70 or only a portion such that the recess can house cooled container C as well as a ball B.

Figure 4:
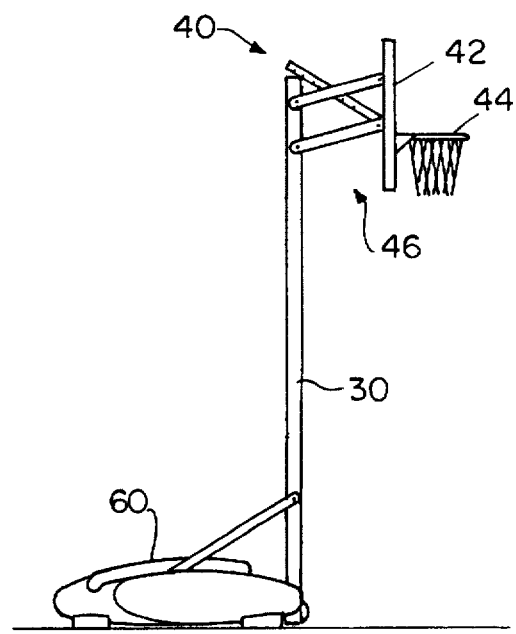
FIG. 4 is a view of the portable athletic assembly of FIG. 1 used to support a basketball backboard and rim.
Figure 5:
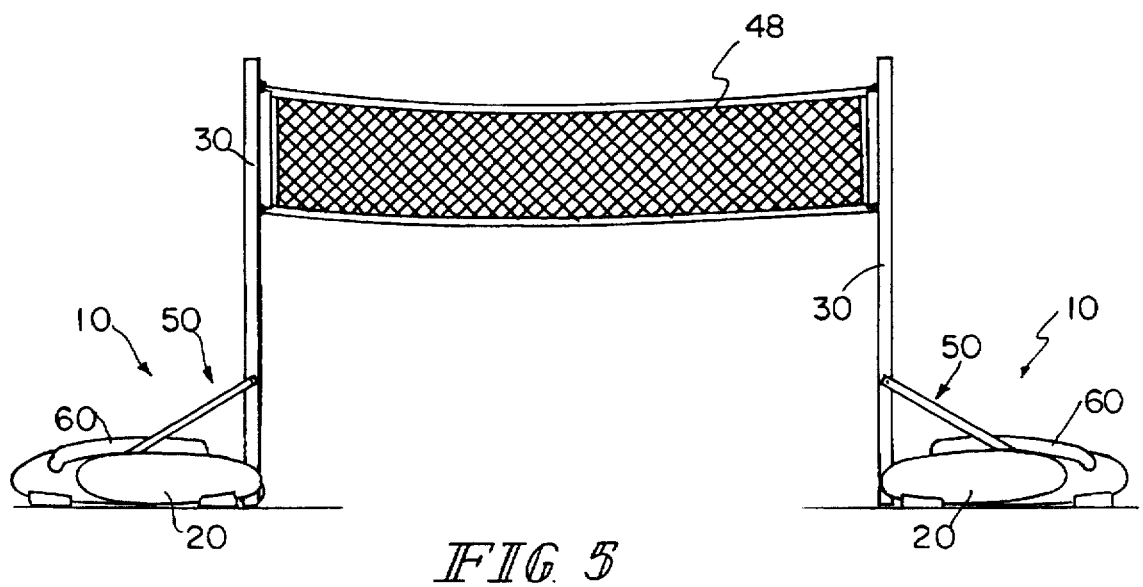
FIG. 5 is a view of a portable athletic assembly of FIG. 1 used to support a volleyball net.

The portable athletic assembly 10 of FIGS. 1–3 may be used to support a basketball backboard and rim, illustrated in FIG. 4. The backboard 42 and rim 44 are connected to the support 30 by an adjustable mechanism 46. Alternatively, the portable athletic assembly of FIGS. 1–3 may be used to support a volleyball net 48 as illustrated in FIG. 5.

The storage compartment, including recess 70 and cover 60 may be used to store other equipment other than the ball or liquid refreshment. It may store clothes, securement devices, tools, ball pumps or any variety of materials or implements which may be used by players.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A portable athletic and cooler assembly including a base, a support connected adjacent a first end of said base for supporting athletic equipment, a brace connected to said base and said support for maintaining said support erect on said base, said base comprising:

a hollow compartment for receiving ballast and including a top wall;

a port providing access to said hollow compartment for insertion of ballast;

a first recess in said top wall of said hollow compartment;

a floor of said recess including a plurality of recesses shaped to received beverage containers; and a coolant in said base for cooling objects in said first recess.

2. The assembly according to claim 1, including a cover attached to said base for covering said first recess and forming a storage compartment with said first recess.

3. The assembly according to claim 2, wherein said storage compartment includes thermally insulated walls.

4. The assembly according to claim 3 wherein said thermally insulated walls are inserts in said first recess.

5. The assembly according to claim 3, wherein said cover includes thermally insulative material.

6. The assembly according to claim 2, wherein said cover is pivotally connected to said base at a first end of said cover.

7. The assembly according to claim 2, wherein said cover is removable from said base.

8. The assembly according to claim 2, wherein said cover forms a continuation of said top surface extending from its attachment to said base.

9. The assembly according to claim 1, wherein said first compartment includes ice as ballast.

10. The assembly according to claim 1 including, a backboard-rim combination connected to said support.

11. The assembly according to claim 1, including a net connected to said support.

12. The assembly according to claim 1, wherein said first recess is sufficiently deep such that a basketball in said first recess is substantially at or below said top wall of the hollow compartment adjacent said first recess.

13. The assembly according to claim 1, wherein said first recess is substantially elliptical for receiving a pair of basketballs.

14. The assembly according to claim 13, wherein a bottom wall of said cover includes a pair of partial spherical recesses, each for receiving a basketball.

15. The assembly according to claim 1, wherein at least one of said container recesses includes a drain.

* * * * *